(12) United States Patent
Belzowski et al.

(10) Patent No.: US 12,415,400 B2
(45) Date of Patent: Sep. 16, 2025

(54) FLUID MANAGEMENT MODULE FOR A VEHICLE

(71) Applicant: VALEO SYSTEMES THERMIQUES, La Verriere (FR)

(72) Inventors: Michal Belzowski, Skawina (PL); Tomasz Stramecki, Skawina (PL); Damian Jurkiewicz, Skawina (PL)

(73) Assignee: VALEO SYSTEMES THERMIQUES, La Verriere (FR)

( * ) Notice: Subject to any disclaimer, the term of this patent is extended or adjusted under 35 U.S.C. 154(b) by 0 days.

(21) Appl. No.: 18/460,733

(22) Filed: Sep. 5, 2023

(65) Prior Publication Data

US 2024/0075790 A1 Mar. 7, 2024

(30) Foreign Application Priority Data

Sep. 6, 2022 (EP) .................................... 22194220

(51) Int. Cl.
*B60H 1/00* (2006.01)
(52) U.S. Cl.
CPC ..... *B60H 1/00571* (2013.01); *B60H 1/00485* (2013.01)
(58) Field of Classification Search
CPC .............. B60H 1/00485; B60H 1/3229; Y10T 137/87885
See application file for complete search history.

(56) References Cited

U.S. PATENT DOCUMENTS

| | | | | |
|---|---|---|---|---|
| 6,371,166 B1* | 4/2002 | Yoshizawa | .......... | F15B 13/0821 137/884 |
| 6,431,207 B1* | 8/2002 | Weiler, Jr. | .......... | F15B 13/0431 251/86 |
| 7,036,528 B2* | 5/2006 | Eidsmore | .............. | F16K 27/003 137/884 |
| 7,213,612 B2* | 5/2007 | Weiler, Jr. | .......... | F16K 15/1823 91/464 |
| 8,522,825 B2* | 9/2013 | Igarashi | ................ | F16K 27/003 411/101 |
| 8,783,295 B2* | 7/2014 | Igarashi | ................ | F16K 27/003 137/271 |
| 2023/0339284 A1* | 10/2023 | Ye | .......... | F28F 9/0253 |
| 2024/0017593 A1* | 1/2024 | Li | .......... | B60K 11/02 |

(Continued)

FOREIGN PATENT DOCUMENTS

| | | |
|---|---|---|
| CN | 111098654 A | 5/2020 |
| CN | 113829832 A | 12/2021 |
| CN | 114750569 A | 7/2022 |

OTHER PUBLICATIONS

European Patent Office, Search Report and Written Opinion of corresponding European patent application No. 22194220.4, dated Feb. 22, 2023.

*Primary Examiner* — Robert K Arundale
(74) *Attorney, Agent, or Firm* — VALEO SYSTEMES THERMIQUES

(57) ABSTRACT

A fluid management module for a vehicle, including a block with at least a valve, and a unit. The unit includes a transferring plate, shaped to form at least one channel for receiving the fluid, and a flat support plate. The block and the unit are fluidly connected together, the valve being configured to distribute the fluid in the channel of the unit. An intermediary channel extends non-collinearly with an inlet part and an outer part of the valve.

7 Claims, 3 Drawing Sheets

(56) References Cited

U.S. PATENT DOCUMENTS

| | | | |
|---|---|---|---|
| 2024/0042825 A1* | 2/2024 | Zhang | H01M 10/613 |
| 2024/0175608 A1* | 5/2024 | Jiang | B60H 1/00485 |
| 2024/0198756 A1* | 6/2024 | Cheng | B60H 1/00342 |
| 2024/0198757 A1* | 6/2024 | Jiang | B60H 1/00485 |
| 2024/0262160 A1* | 8/2024 | Ye | B60H 1/00507 |
| 2024/0317016 A1* | 9/2024 | Martin | B60H 1/00885 |

\* cited by examiner

FLUID MANAGEMENT MODULE FOR A VEHICLE

TECHNICAL FIELD

This disclosure pertains to the field of thermal management systems for a vehicle.

BACKGROUND OF THE INVENTION

Modern vehicles have thermal management systems such as cooling/heating circuits to provide comfort functions for the users of the vehicle and to ensure a necessary temperature control of components such as drive components. Cooling/heating circuits essentially consist of thermal management components such as pumps, valves and heat exchangers, and of components that serve to guide a fluid and that fluidically connect the thermal management components with each other, such as fluid management modules. The fluid flows back and forth in the circuits and exchanges energy with the air of the cabin's vehicle, which ensures the thermal management of the air.

The development of the electric vehicles has increased the need of optimized air conditioning systems as well as heat pump systems with simplified and cost-effective processes of manufacturing.

BRIEF SUMMARY OF THE INVENTION

This disclosure improves the situation.

There is proposed a fluid management module for a vehicle, comprising: a block for the distribution of the fluid in the module, said block comprising at least a valve, a unit for the circulation of the fluid in the module, the unit comprising at least a plate, called transferring plate, shaped to form at least one channel for receiving the fluid, and a plate, called support plate, the support plate being flat, the block and the unit being fluidly connected together, the valve being configured to distribute the fluid in the channel of the unit, wherein the valve comprises an inlet part of the valve and an outlet part of the valve, the inlet part comprising a body and a plunger, the body being provided with a bore extending longitudinally along an axis, called inlet axis, the plunger being shaped to reciprocate in said bore, the outlet part comprising a body provided with a bore extending longitudinally along an axis, called outlet axis, the inlet axis and the outlet axis being parallel, the valve further comprising a channel, called intermediary channel, extending longitudinally along an axis, called channel axis, from the inlet part of the outlet part, the channel axis being non colinear with the inlet axis and the outlet axis.

In other words, the channel axis is inclined relatively to the inlet axis and to the outlet axis.

Thanks to the module, the packaging is more compact, and the unit can be managed by the block, the valve distributing the fluid in the channels, which ensures an optimized functioning of the thermal management of the vehicle while simplifying the process of manufacturing of the module.

In another aspect, the channel axis forms an angle with the inlet axis between 25° and 75°.

In another aspect, the channel axis forms an angle with the inlet axis between 30° and 70°.

In another aspect, the intermediary channel comprises an entrance end connected to the inlet part and an exit end connected to the outlet part, the entrance end being disposed below the exit end in a functional position of the module in the vehicle.

In another aspect, the body of the inlet part comprises an opening connected to the entrance end of the intermediary channel and the body of the outlet part comprises an opening connected to the exit end of the intermediary channel, said opening of the inlet part body being disposed below said opening of the outlet part body.

In another aspect, the support plate is disposed between the block and the transferring plate.

In another aspect, the support plate comprises at least a hole in front of the channels of the transferring plate, said hole being arranged to be located in front of the valve.

In another aspect, curvatures of the transferring plate constitute the channels.

The present disclosure is also about a unit for the circulation of a fluid in a fluid management module, the unit comprising at least a plate, called transferring plate, shaped to form at least one channel for receiving the fluid, and a plate, called support plate, the support plate being flat, the unit being arranged to cooperate with a block for the distribution of the fluid in the module, said block comprising at least a valve, the unit being arranged to be fluidly connected to the block in a functioning position of the module such that the fluid is distributed in the channel by the valve, wherein the valve comprises an inlet part of the valve and an outlet part of the valve, the inlet part comprising a body and a plunger the body being provided with a bore extending longitudinally along an axis, called inlet axis, the plunger being shaped to reciprocate in said bore, the outlet part comprising a body provided with a bore extending longitudinally along an axis, called outlet axis, the inlet axis and the outlet axis being parallel, the valve further comprising a channel, called intermediary channel, extending longitudinally along an axis, called channel axis, from the inlet part to the outlet part, the channel axis being non colinear with the inlet axis and the outlet axis.

In other words, the channel axis is inclined relatively to the inlet axis and to the outlet axis.

In another aspect, the process comprises a step of forming the block by machining and a step of forming the unit by an operation distinct from machining.

In another aspect, the step of forming the unit comprises a step of forming the channels by extrusion or stamping of a plate.

In another aspect, the support plate and the transferring plate are attached together by welding or brazing.

In another aspect, a valve body of the block is attached to the hole.

In another aspect, the block and the unit are fixed by welding, brazing, vacuum holding, gluing, mechanical fixation.

The present disclosure is also about a fluid management module for a vehicle, comprising: a block for the distribution of the fluid in the module, said block comprising at least a valve, the valve having a valve body provided with a bore and a plunger configured to reciprocate within said bore, the valve body stemming from a machining process, a unit for the circulation of the fluid in the module, comprising a plate, called transferring plate, shaped to form at least one channel for receiving the fluid, and another plate, called support plate, the support plate being flat, said transferring plate and support plate stemming from a process excluding a machining process.

In another aspect, the support plate is disposed between the block and the transferring plate.

In another aspect, the support plate comprises at least a hole in front of the channels of the transferring plate, said hole being arranged to receive a valve body of the valve.

In another aspect, curvatures of the transferring plate constitute the channels.

In another aspect, the curvatures are made from extrusion or stamping.

BRIEF DESCRIPTION OF THE DRAWINGS

Other features, details and advantages will be shown in the following detailed description and on the figures, on which.

DETAILED DESCRIPTION OF THE INVENTION

In the figures, there is drawn a triplet of axis (X, Y, Z) to guide the reader with the spatial orientation.

Figure 1:
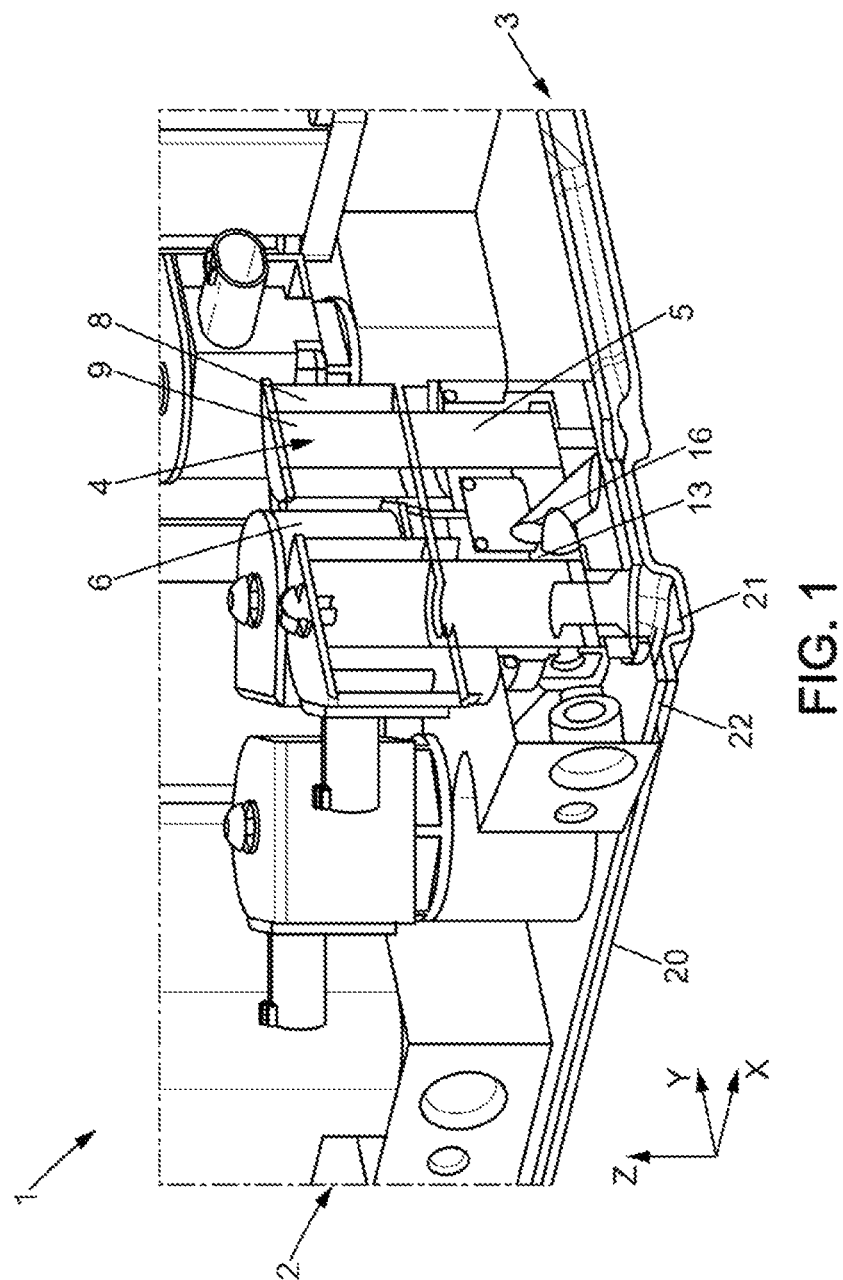
FIG. 1 is a perspective view of the module of a fluid management module according to an embodiment with a partial section a sectional view.

FIG. 1 shows a fluid management module 1. The fluid management module 1 can also called a hub. The fluid management module 1 is intended to be part of a thermal management system of a vehicle in which the fluid flows in an air conditioning and/or heat pump circuits. In this system, the air temperature is controlled by thermal exchanges of the air with the fluid in said circuits. The fluid management module 1 can comprise several units, one of them being so-called refrigerant unit which ensures distribution of the refrigerant fluid in components of the thermal management system, like the compressor, heat exchangers, such as an evaporator and/or a chiller and/or a condenser and/or PT (pressure temperature) sensors and/or valves and/or AC (air conditioning) lines. The fluid management module 1 can also play a purely structural role. Different components of the thermal management system can be attached to, for example refrigerant unit: a condenser and/or a water condenser and/or a heat exchanger (evaporator and/or chiller) and/or PT (pressure temperature) sensors, and/or valves and/or AC (air conditioning) lines.

In a functional position of the fluid management module 1 in the vehicle, the Z axis is vertical, while the X and Y axis are horizontal.

The fluid management module 1 comprises a block 2 for the distribution of the fluid in the fluid management module 1 and a unit 3 for the circulation of the fluid in the fluid management module 1.

The block 2 will be detailed below.

The block 2 comprises at least one valve. In the figures, the block 2 comprises several valves, referenced 4. The valves 4 can be shut-off valves, progressive valves, EXV (for electronic expansion valve) or TXV (for thermostatic expansion valve).

The valve 4 will be detailed below.

Figure 2:
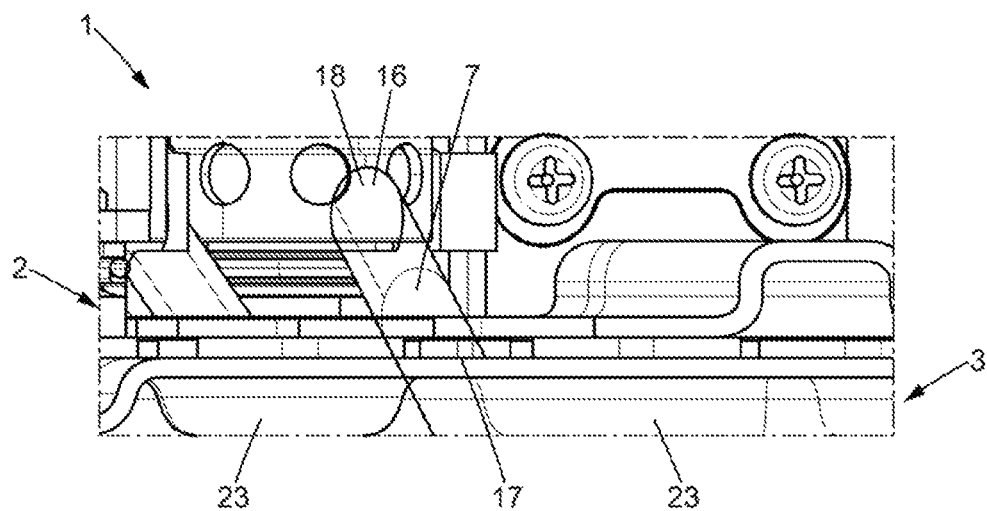
FIG. 2 is a perspective view of details of the module of FIG. 1.
Figure 3:
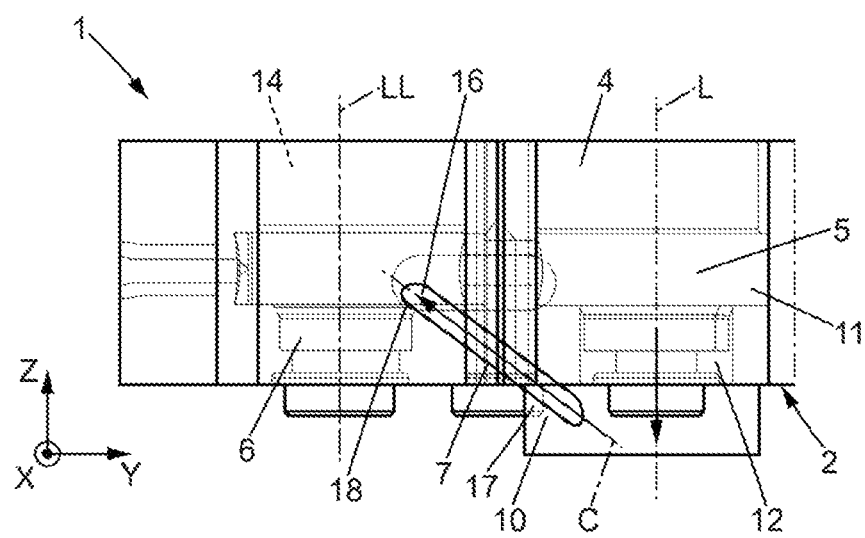
FIG. 3 is another perspective view of details of the module of FIG. 1.

As can be seen in FIG. 1, the valve 4 comprises an inlet part 5, an outlet part 6, and an intermediary channel 7, the fluid flowing inside the valve 4 from the inlet part 5 to the outlet part 6 via the intermediary channel 7 (shown in FIGS. 2 and 3).

The inlet part 5 comprises a body 8 provided with a bore 9. The bore 9 longitudinally extends along an axis L parallel to the Z axis. The axis L is called inlet axis. The inlet part body 8 is also provided with an entrance opening for the distribution of the fluid by the valve 4 and an exit opening 10 for the distribution of the fluid from the inlet part 5 to the intermediary channel 7.

As can be seen in FIG. 3, a plunger 11 is disposed in the bore 9 such that an external wall of the plunger 11 contacts an inner wall of the inlet part body 8. The plunger 11 extends longitudinally from an upper end to a bottom end 12.

The plunger 11 is arranged to reciprocate from a closed position to an open position. In the closed position, the plunger 11 forbids any distribution of the fluid in the valve 4, whereas, in the open position, the bottom end 12 of the plunger 10 is located above the exit opening 10, which authorizes the fluid distribution from the inlet part 5 to the intermediary channel 7.

The outlet part 6 of the valve 4 comprises a body 13 provided with a bore 14. The bore 14 extends longitudinally along an axis LL, called outlet axis. As can be seen from the figures, the outlet axis LL is parallel to the inlet axis L. The outlet part body 13 is also provided with an entrance opening 16 for the distribution of the fluid from the intermediary channel 7 and an exit opening for the distribution of the fluid outside the valve 4.

The intermediary channel 7 extends longitudinally along an axis, called channel axis C, from an entrance end 17 to an exit end 18. The entrance end 17 is connected to the exit opening 10 of the inlet part 5 while the exit end 18 is connected to the entrance opening 16 of the outlet part 6.

Figure 4:
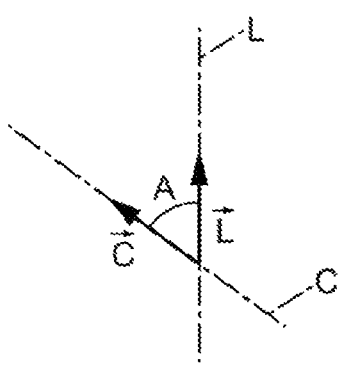
FIG. 4 is a schematic view of an angle of details of the module of FIG. 1.

As clearly seen in FIGS. 3 and 4, the channel axis C is disposed non colinearly with the inlet axis L and the outlet axis LL. In other words, the intermediary is inclined relatively to the inlet axis L and outlet axis LL.

Advantageously, the channel axis C forms an angle A with the inlet axis L between 25° and 85°. Preferably, the channel axis C forms an angle A with the inlet axis between 30° and 70°.

Said differently, the angle A can be defined as the intersection of a vector $\vec{L}$ and a vector $\vec{C}$, the vector $\vec{L}$ being parallel to the inlet axis L—upward, and the vector $\vec{C}$ being parallel to the channel axis C—upward.

As can also be seen FIGS. 2 and 3, a level of the entrance end 17 of the intermediary channel 7 is disposed below a level of the exit end 18 when the fluid management module 1 is installed in the functional position.

As can also be seen from the figures, a level of the exit opening 10 of the inlet part 5 is disposed below a level of the entrance opening 16 of the outlet part 6.

Thanks to this configuration, the outlet part 6 of the valve 4 is fed from bottom to top. In other words, the fluid is pushed backwards in the inlet part 5 to the entrance end 17 of the intermediary channel 7, then the fluid flows upward in the intermediary channel to the outlet part 6.

This configuration ensures an optimized packaging of the valve 4 and the fluid management module 1 as well as an optimized flow of the fluid inside the fluid management module 1.

Preferably, the block 2 stems from a machining process that ensures high precision in the shaping of the block. Said differently, the block 2 can be considered as a high requirement zone, since the movement of the plunger 11 in the bore 9 should be accurately controlled and hence necessitates an as exact form of the bore as possible. And a machining process gives optimal results when removing material.

The block 2 can be made of a metallic material, like aluminum, which ensures a good rigidity, even though the invention is not limited to this material. Depending on the pressure of the fluid in the fluid management module 1, the block 2 could be made of plastic (for low pressures of the fluid).

The unit 3 will be detailed below.

As can be seen from the figures, the unit 3 comprises at least a plate, called transferring plate, that is referenced 20. The transferring plate 20 is shaped to form at least one channel or corrugation 21 for the circulation of the fluid. In other words, curvatures of the transferring plate 20 constitute passages that form the channels 21.

In the illustrated embodiment, the unit 3 comprises two plates, even though the number of plates is not limited to two.

As shown in FIGS. 1 and 2, the other plate of the unit 3 is referenced 22 and called support plate 22. The support plate 22 is configured to interface the unit 3 with the block 2. The support plate 22 is flat to contact a bottom part BP of the block 2. The support plate 22 is situated between the block 2 and the bottom plate 20 in a (Y,Z) plane.

The support plate 22 comprises holes 23, each hole 23 being arranged to receive an end of the block 2.

The holes 23 are in front of the channels 21, such that the unit 3 and the block 2 are in a fluidic relationship. The block 2 and the unit 3 fluidly connect each other, the fluid in the fluid management module 1 being distributed in the channels 21 by the valves 4.

Preferably, the valve body 5 is attached to the support plate 22 by crimping, which guarantees sealing between the unit 3 and the block 2.

The plates 20, 22 can be made of a metallic material, like aluminum, which ensures a good rigidity, even though the invention is not limited to this material. Depending on the pressure of the fluid in the fluid management module 1, the plates 20, 22 could be made of plastic (for low pressures of the fluid).

The channels 21 of the transferring plate 20 are preferably obtained by an extrusion process or a stamping process of a planar plate even though the invention is not limited to such a process. It should be noted that none of the plates 20, 22 of the unit 3 results from machining.

Advantageously, the unit 3 is manufactured before its fixation to the block 2. The plates 20, 22 are assembled by welding or brazing (a brazing foil or ring can be added to improve brazeability) or gluing, depending on the nature of the plates.

The connection of the block 2 to the unit 3 can be made by welding, brazing, vacuum holding, gluing, or even by fixing with screws, with, in this case, a gasket between the block 2 and the support plate 22, and holes in the support plate 22 and the transferring plate 20.

It is worth noting that the transferring plate 20 not only conducts the fluid, but it also increases the stiffness of the fluid management module 1 thanks to its corrugations 21. In addition, the transferring plate 21 has also a poka yoke function thanks to the position of the channels 21.

The described embodiment of the fluid management module 1 has the advantage that the transferring plate 20 only comprises the channels 21. In other words, the present invention suppresses any channel part from the block. Apart from the weight of such a part, which is machined in a block of metal, the machining itself is reduced.

The described embodiment of the fluid management module 1 has the advantage that only the block 2 should be machining, only along the Z axis, given that the unit 3 can be considered as a low requirement zone. Thus, the fluid management module 1 is lighter and cheaper than the known fluid management modules.

The described embodiment of the fluid management module 1 ensures a flexibility in the manufacturing process since the unit 3 can be prepared independently and then the valves 4 can all be fixed, simultaneously or one by one, to the unit 3.

The choice of the material of the plates and their assembling process is also flexible, since it can be adapted to the application of the fluid management module 1.

The present disclosure is also about the unit 3 itself, as already described.

The present disclosure is also about the process of manufacturing of the fluid management module 1, the steps being already described.

What is claimed is:

1. A fluid management module for a vehicle, comprising:
a block for distribution of the fluid in the fluid management module, including at least a valve,
a unit for circulation of the fluid in the fluid management module, including at least a transferring plate shaped to form at least one channel for receiving the fluid, and a support plate, the support plate being flat,
the block and the unit being fluidly connected together, the valve being configured to distribute the fluid in the at least one channel of the unit, wherein the valve includes an inlet part and an outlet part, the inlet part including an inlet body and a plunger, the inlet body being provided with an inlet bore extending longitudinally along an inlet axis, the plunger being configured to reciprocate in said inlet bore, the outlet part including an outlet body provided with an outlet bore extending longitudinally along an outlet axis, the inlet axis and the outlet axis being parallel, the valve further including an intermediary channel, extending longitudinally along a channel axis from the inlet part to the outlet part, the channel axis being non colinear with the inlet axis and the outlet axis, wherein the support plate is disposed between the block and the transferring plate.

2. The fluid management module according to claim 1, wherein the channel axis forms an angle with the inlet axis between 25° and 75°.

3. The fluid management module according to claim 2, wherein the channel axis forms an angle with the inlet axis between 30° and 70°.

4. The fluid management module according to claim 1, wherein the intermediary channel includes an entrance end connected to the inlet part and an exit end connected to the outlet part, the entrance end being disposed below the exit end in a functional position of the fluid management module in the vehicle.

5. The fluid management module according to claim 4, wherein the inlet body of the inlet part includes an inlet opening connected to the entrance end of the intermediary channel and the outlet body of the outlet part includes an outlet opening connected to the exit end of the intermediary channel, said inlet opening being disposed below said outlet opening in a functional position of the fluid management module in the vehicle.

6. The fluid management module according to claim 1, wherein the support plate includes at least a hole in front of the at least one channel of the transferring plate, said hole being arranged to be located in front of the valve.

7. The fluid management module according to claim 1, wherein the transferring plate includes curvatures constituting the at least one channel.

\* \* \* \* \*